Figure 1:
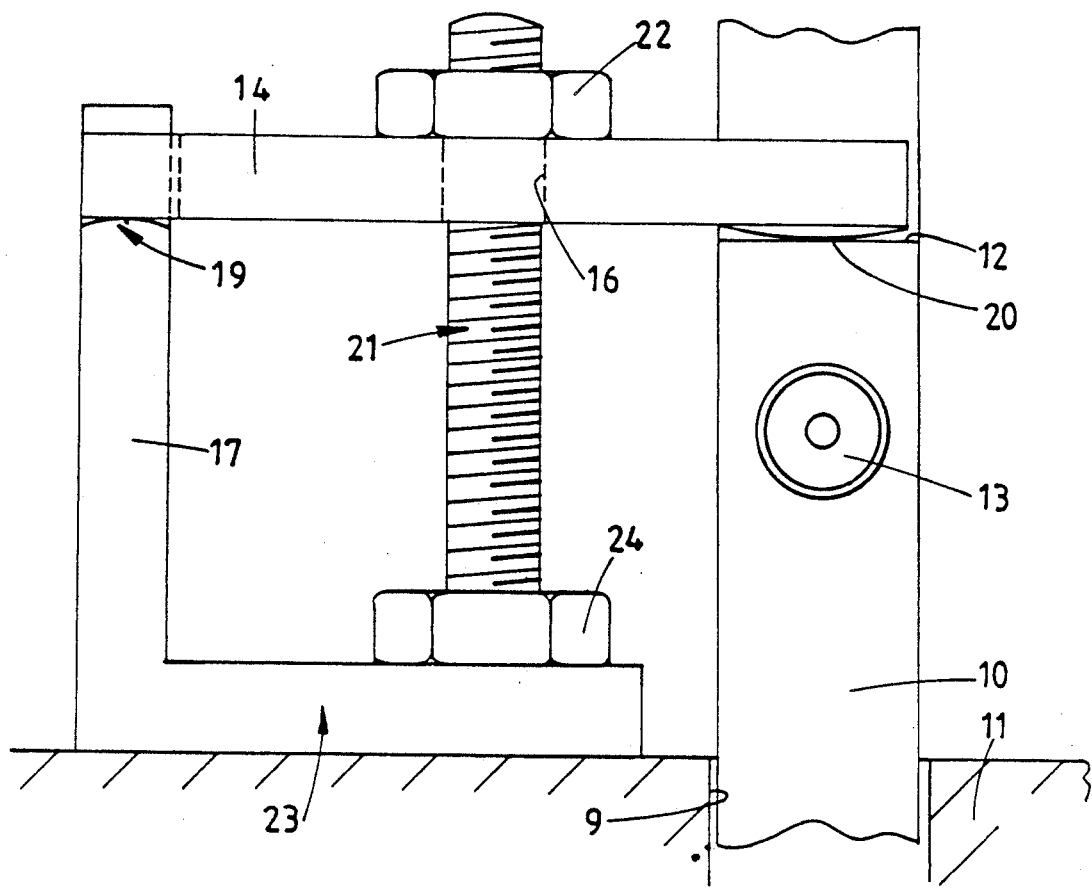

United States Patent [19]

Gaskell

[11] Patent Number: 4,991,279
[45] Date of Patent: Feb. 12, 1991

[54] CLAMPING ARRANGEMENT

[75] Inventor: David J. Gaskell, Suffolk, Great Britain

[73] Assignee: Lucas Industries Public Limited Company, Birmingham, England

[21] Appl. No.: 280,121

[22] Filed: Dec. 5, 1988

[30] Foreign Application Priority Data

Dec. 5, 1987 [GB] United Kingdom ............... 8728518

[51] Int. Cl.[5] .............................................. B23Q 1/00
[52] U.S. Cl. ..................................... 29/281.1; 269/91
[58] Field of Search ..................... 29/281.1, 257, 217, 29/218; 269/91, 94, 275

[56] References Cited

U.S. PATENT DOCUMENTS

| | | | |
|---|---|---|---|
| 896,336 | 8/1908 | Swenson | 29/218 |
| 1,051,633 | 1/1913 | Price | 29/218 |
| 1,251,516 | 1/1918 | Hardesty | 269/94 |
| 1,376,077 | 4/1921 | Cadwallader | 269/93 |
| 1,536,310 | 5/1925 | Rothlisberger | 269/91 |
| 2,960,953 | 11/1960 | Schneider | 269/275 |
| 3,052,461 | 9/1962 | Bateman | 269/275 |
| 4,429,862 | 2/1989 | Niedecker | 269/91 |
| 4,432,538 | 2/1984 | Sequin | 269/93 |

Primary Examiner—Robert C. Watson
Attorney, Agent, or Firm—Balogh, Osann, Kramer, Dvorak, Genova & Traub

[57] ABSTRACT

A clamp for a fuel injection nozzle of an internal combustion engine includes a beam element which is forked at one end for engagement with surfaces on the nozzle and at its other end engages a reaction member. Intermediate its ends the beam element is apertured to receive a threaded member engaged with the cylinder head of the engine whereby the nozzle is clamped in a bore in the cylinder head. The beam element is formed from strip material and is dimensioned so that the force which can be applied to the nozzle is limited by the elastic deformation of the beam element.

3 Claims, 2 Drawing Sheets

CLAMPING ARRANGEMENT

This invention relates to a clamp for use when clamping a fuel injection nozzle within a bore in the cylinder head of an engine.

Fuel injection nozzles for compression ignition engines are usually of cylindrical form and are located within a bore in the cylinder head of the engine. A gas-tight seal is established between the body of the nozzle and a part of the bore and whilst it is possible to use seal rings accommodated within grooves within the wall of the nozzle body, it is usual to provide a step in the bore against which an annular step defined on the nozzle body is engaged by the application of an axial force to the body.

Various clamping arrangements are known, one such arrangement being described in British Published Application No. 2149842A. In the arrangement described in this specification a clamping element is employed which is constructed from an elongated metal strip which is bent transversely to the desired shape and riveted and/or welded to secure the clamping element in its desired shape. The element has a forked end portion the forks of which engage steps respectively defined on the body of the nozzle. In order to prevent spreading of the forks in use the strip material from which the element is formed has considerable thickness and width so that the beam strength of the element is high. The result is that a very high axial load can be imposed upon the nozzle.

In the past fuel injection nozzles have been of the single spring variety with the result that excessive axial loading of the nozzle body during the process of clamping the nozzle within the engine bore has had little effect upon the performance of the nozzle. However, recent designs of nozzle incorporate two springs and the valve member of the nozzle is arranged to have a limited lift from its seating during the initial stage of fuel delivery through the nozzle. The limited lift is very small and the various components forming the nozzle have to be very carefully adjusted during the assembly of the nozzle. It has been found that if during the assembly of the nozzle to the engine the securing nut is tightened excessively, the axial load imposed on the nozzle body is sufficient to distort the nozzle body by an amount which upsets the careful adjustment effected during the assembly of the nozzle.

The object of the present invention is to provide a clamp for the purpose specified in a simple and convenient form.

According to the invention a clamp for use when clamping a fuel injection nozzle within a bore in the cylinder head of an engine comprises a beam element formed from strip material, the element at one end being forked for engagement in use with steps defined on the body of the nozzle, the element at its other end engaging in use a reaction post and intermediate its ends being apertured to receive a threaded member engaged with the cylinder head of the engine, the arrangement being such that in use, the axial force which can be applied to the nozzle body is limited by the elastic deformation of the beam element.

Figure 2:
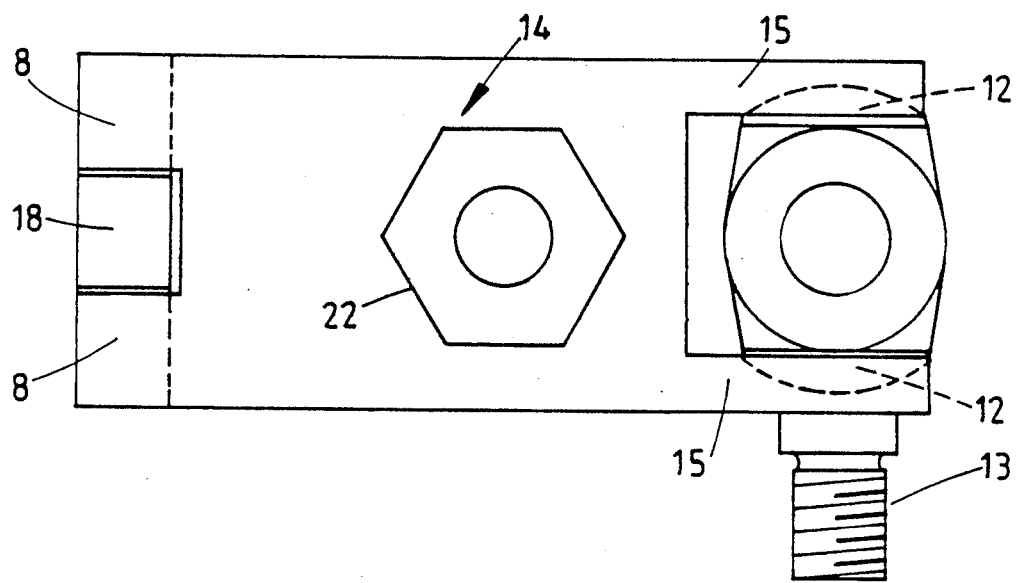
Figure 3:
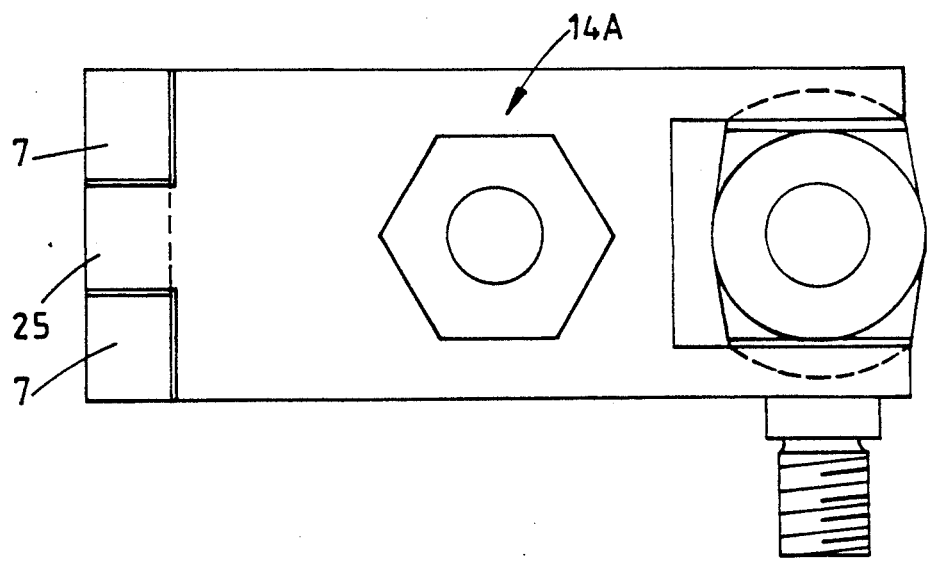
Figure 4:
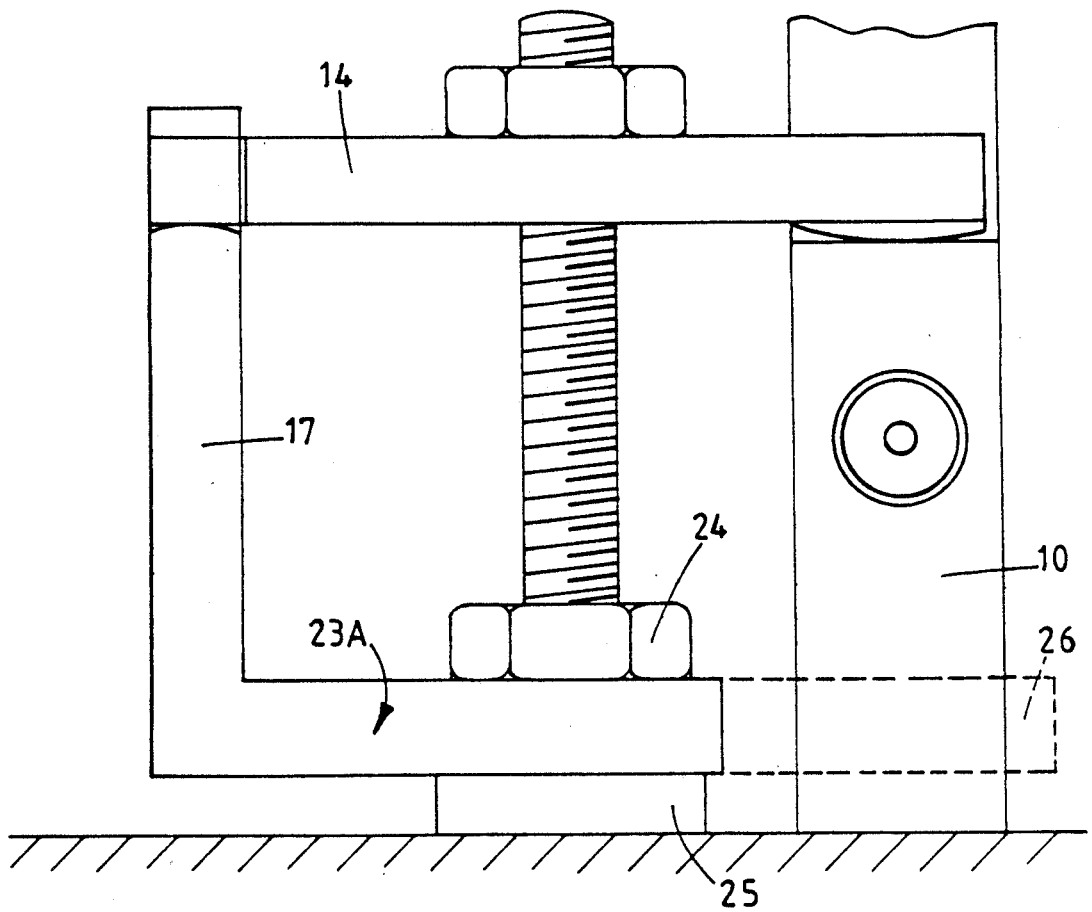

Examples of clamping arrangement in accordance with the invention will now be described with reference to the accompanying drawings in which:

FIG. 1 is a side elevation of one example of a clamp in accordance with the invention, FIG. 2 is a plan view of the clamp shown in FIG. 1, FIG. 3 is a view similar to FIG. 2 showing a modified form of clamp, and FIG. 4 is a view similar to FIG. 1 showing a further modification of the clamp.

Referring to FIG. 1 of the drawings, a fuel injection nozzle is seen at 10 and is located within a bore 9 in the cylinder head 11 of an engine. The nozzle body is of generally cylindrical form and as shown more clearly in FIG. 2, is provided with a pair of shoulders 12 on opposite sides of the body. The nozzle body also has a fuel inlet 13 which in use, is connected by a pipeline to a fuel injection pump.

In order to impose an axial load upon the body of the nozzle a clamp arrangement is provided and this comprises a beam element 14 which is formed from flat material and at one end is forked defining a pair of forks 15 for engagement with the shoulders 12 respectively. At its opposite end the element is also forked to define ears 8 and intermediate its ends it is provided with a circular aperture 16. The beam is therefore of generally "H" configuration in plan, and at its end removed from the nozzle the beam is in engagement with a reaction post 17 which extends upwardly generally parallel to the nozzle. The post 17 is conveniently provided with a location component 18 which locates between the bifurcated portions of the end of the beam. The post 17 defines convex surfaces 19 presented to the beam and the latter defines convex surfaces 20 which are presented to and engaged with the shoulders 12.

Extending through the aperture 16 is a threaded retaining member which in the particular example, comprises a threaded stud 21 which is secured within the cylinder head of the engine and engaged with the stud is a nut 22 which is tightened when it is required to clamp the nozzle within the bore. Intermediate the upper surface of the beam and the nut 22 there may be provided a washer (not shown) which defines a convex surface presented to the upper surface of the beam.

The dimensions of the beam i.e. thickness, width and length are carefully chosen so that when the nut is tightened the beam undergoes elastic deformation. The axial loading applied to the nozzle body is therefore controlled and is less sensitive to the degree of tightening of the nut 22.

Conveniently and as shown in FIG. 1, the post 17 is integrally formed with a support member 23 which is clamped to the cylinder head 11 of the engine by means of a further nut 24 engaged upon the stud 21.

The post 17 may be inclined to the axis of the stud 21 and the nozzle 10 conveniently by having its lower end closer to the axis of the stud than its upper end. The inclination of the post reduces it rigidity.

The beam 14 in the examples shown in FIGS. 1 and 2 engages with the reaction post 17 and the nozzle at four zones of line contact and in order to better accommodate any misalignment, the beam 14A as shown in FIG. 3, may be provided with a single tongue 25 which engages with the reaction post 17 the latter having a central recess, to receive the tongue 25, the recess being defined by a pair of ears 7.

A modification is seen in FIG. 4, in which the support member 23A is spaced clear of the upper surface of the cylinder head by means of a thick washer 25.

In this example the reaction post 17 is of a slightly reduced length and in use, the support member 23A also flexes in use to enhance the flexibility of the beam 14. Moreover, the support member 23A may be provided, as illustrated in FIG. 4, with extensions 26 which extend on opposite sides of the body of the nozzle thereby to locate the support member and the reaction post 17 when the nut 24 is tightened.

A further modification is to form the support member and the reaction post as two components so that in effect a hinge is formed at the junction thereof. The two separate components may be non-detachably secured together whilst at the same time allowing pivotal movement, in any convenient manner and furthermore, the beam and the reaction post can also be non-detachably coupled together.

I claim:

1. A clamp for use when clamping a fuel injection nozzle within a bore of the cylinder head of an engine, comprising; an elongated beam element having forks at one end, said forks engageable with steps on the nozzle, an opposite end of said beam element engageable with a reaction member, said beam element having an aperture intermediate its ends, said reaction member being inclined to the longitudinal axis of the nozzle, a threaded member disposed in said aperture, said threaded member being engageable with the cylinder head, said beam element being formed from strip material and dimensioned so that an axial force applied to the nozzle is limited by elastic deformation of said beam element.

2. A clamp according to claim 1, wherein said forks have convex surfaces which are engageable with said steps.

3. A clamp according to claim 1, wherein said beam element and said reaction member define interengaging tongues and ears.

* * * * *